United States Patent
Sheppard et al.

(10) Patent No.: US 12,363,365 B2
(45) Date of Patent: *Jul. 15, 2025

(54) METHODS AND APPARATUS TO ESTIMATE POPULATION REACH FROM MARGINAL RATINGS WITH MISSING INFORMATION

(71) Applicant: The Nielsen Company (US), LLC, New York, NY (US)

(72) Inventors: Michael Sheppard, Holland, MI (US); Dipti Shah, Pleasanton, CA (US); Ajete Junuzi, Clearwater, FL (US); Molly Poppie, Arlington Heights, IL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/437,927

(22) Filed: Feb. 9, 2024

(65) Prior Publication Data
US 2024/0187666 A1    Jun. 6, 2024

Related U.S. Application Data

(63) Continuation of application No. 18/151,993, filed on Jan. 9, 2023, now Pat. No. 11,924,488, which is a
(Continued)

(51) Int. Cl.
*H04N 21/258*     (2011.01)
*G06F 17/18*      (2006.01)
*G06Q 30/0201*    (2023.01)

(52) U.S. Cl.
CPC ....... *H04N 21/25883* (2013.01); *G06F 17/18* (2013.01); *G06Q 30/0201* (2013.01)

(58) Field of Classification Search
None
See application file for complete search history.

(56) References Cited

U.S. PATENT DOCUMENTS 8,423,406 B2 * 4/2013 Briggs .............. G06Q 30/0202
                                              705/14.42
8,453,173 B1 * 5/2013 Anderson ............ H04N 21/254
                                              706/45

(Continued)

*Primary Examiner* — Omar S Parra (57) ABSTRACT

Methods, apparatus, and articles of manufacture are disclosed to estimate population reach from marginal ratings with missing information. An example apparatus includes a pseudo universe calculator to (i) determine a first pseudo universe estimate for a first audience of media corresponding to a first union of first margins, the first margins corresponding to known audience totals, and (ii) determine a second pseudo universe estimate for a second audience of the media corresponding to a second union of second margins, the determination based on an audience constant, the second margins including a margin corresponding to an unknown audience total. The example apparatus also includes a reach calculator to (i) determine an estimate of the unknown audience total of the second audience based on the second pseudo universe estimate for the second audience, and (ii) determine a reach estimate for the second union based on the first and second pseudo universe estimates.

20 Claims, 4 Drawing Sheets

Related U.S. Application Data continuation of application No. 17/099,510, filed on Nov. 16, 2020, now Pat. No. 11,553,226.

(56) References Cited

U.S. PATENT DOCUMENTS

| | | | |
|---|---|---|---|
| 2008/0228543 A1* | 9/2008 | Doe | G06Q 30/02 703/2 |
| 2017/0300911 A1* | 10/2017 | Alnajem | G06Q 20/4014 |
| 2018/0249211 A1* | 8/2018 | Sheppard | G06Q 30/0201 |

* cited by examiner

METHODS AND APPARATUS TO ESTIMATE POPULATION REACH FROM MARGINAL RATINGS WITH MISSING INFORMATION

CROSS-REFERENCE TO RELATED APPLICATIONS

This disclosure is a continuation of U.S. patent application Ser. No. 18/151,993, filed Jan. 9, 2023, now issued as U.S. Pat. No. 11,924,488, which is a continuation of U.S. patent application Ser. No. 17/099,510, filed Nov. 16, 2020, now issued as U.S. Pat. No. 11,553,226, each of which is hereby incorporated herein by reference in their entireties.

BACKGROUND

Determining a size and demographics of an audience of a media presentation helps media providers and distributors schedule programming and determine a price for advertising presented during the programming. In addition, accurate estimates of audience demographics enable advertisers to target advertisements to certain types and sizes of audiences. To collect these demographics, an audience measurement entity enlists a group of media consumers (often called panelists) to cooperate in an audience measurement study (often called a panel) for a predefined length of time. In some examples, the audience measurement entity obtains (e.g., directly, or indirectly from a media service provider) return path data from media presentation devices (e.g., set-top boxes) that identifies tuning data from the media presentation device. In such examples, because the return path data may not be associated with a known panelist, the audience measurement entity models and/or assigns viewers to represent the return path data. Additionally, the media consumption habits and demographic data associated with the enlisted media consumers are collected and used to statistically determine the size and demographics of the entire audience of the media presentation. In some examples, this collected data (e.g., data collected via measurement devices) may be supplemented with survey information, for example, recorded manually by the presentation audience members.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Audience measurement entities seek to understand the composition and size of audiences of media, such as television programming. Such information allows audience measurement entity researchers to, for example, report advertising delivery and/or targeting statistics to advertisers that target their media (e.g., advertisements) to particular audiences. Additionally, such information helps to establish advertising prices commensurate with audience exposure and demographic makeup (referred to herein collectively as "audience configuration"). One way to gather media presentation information is to gather the media presentation information from media output devices (e.g., gathering television presentation data from a set-top box (STB) connected to a television). As used herein, media presentation includes media output by a media device regardless of whether or not an audience member is present (e.g., media output by a media output device at which no audience is present, media exposure to an audience member(s), etc.).

A media presentation device (e.g., STB) provided by a service provider (e.g., a cable television service provider, a satellite television service provider, an over the top service provider, a music service provider, a movie service provider, a streaming media provider, etc.) or purchased by a consumer may contain processing capabilities to monitor, store, and transmit tuning data (e.g., which television channels are tuned by the media presentation device at a particular time) back to the service provider, which can then aggregate and provide such return path data to an audience measurement entity (e.g., The Nielsen Company (US), LLC.) to analyze media presentation activity. Data transmitted from a media presentation device back to the service provider is referred to herein as return path data. Return path data includes tuning data. Tuning data is based on data received from the media presentation device while the media presentation device is on (e.g., powered on, switched on, and/or tuned to a media channel, streaming, etc.). Although return path data includes tuning data, return path data may not include data related to the user viewing the media corresponding to the media presentation device. Accordingly, return path data may not be able to be associated with specific viewers, demographics, locations, etc.

To determine aspects of media presentation data (e.g., which household member is currently consuming a particular media and the demographics of that household member), market researchers may perform audience measurement by enlisting a subset of the media consumers as panelists. Panelists or monitored panelists are audience members (e.g., household members, users, panelists, etc.) enlisted to be monitored, who divulge and/or otherwise share their media activity and/or demographic data to facilitate a market research study. An audience measurement entity typically monitors media presentation activity (e.g., viewing, listening, etc.) of the monitored panelists via audience measurement system(s), which may include one or more metering devices, local people meters (LPMs), etc. Audience measurement typically includes determining the identity of the media being presented on a media output device (e.g., a television, a radio, a computer, etc.), determining data related to the media (e.g., presentation duration data, timestamps, channel data, etc.), determining demographic information of an audience, and/or determining which members of a household are associated with (e.g., have been exposed to) a media presentation. For example, an LPM in communication with an audience measurement entity communicates audience measurement (e.g., metering) data to the audience measurement entity. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In some examples, metering data (e.g., including media presentation data) collected by an LPM or other meter is stored in a memory and transmitted via a network, such as the Internet, to a datastore managed by the audience measurement entity. Typically, such metering data is combined with additional metering data collected from a group of LPMs monitoring a group of panelist households. The metering data may include, but are not limited to, a number of minutes a household media presentation device was tuned to a particular channel, a number of minutes a household media presentation device was used (e.g., consumed) by a household panelist member and/or a visitor (e.g., a presentation session), demographics of the audience (which may be statistically projected based on the panelist data), information indicative of when the media presentation device is on or off, and/or information indicative of interactions with the media presentation device (e.g., channel changes, station changes, volume changes, etc.), etc. As used herein, a channel may be a tuned frequency, selected stream, an address for media (e.g., a network address), and/or any other identifier for a source and/or carrier of media.

In some examples, the audience measurement entity processes the collected and/or aggregated metering data from panelist to represent a total audience and obtains (e.g., from one or more service provider) return path data corresponding to a total audience. These monitored panelists may be selected from a panel (e.g., a national panel of metered users) based on a regional proximity to a designated market area, a similarity between demographics of the monitored panelists and demographics of the return path data audience location, household media characteristics (e.g., how the households receive television signals (cable, satellite, over-the-air radio, etc.)), a similarity between media consumption of the monitored panelists and the return path data audience, etc. As used herein, a return path data audience is represented by audience (e.g., viewer or listener) assigned return path data associated with a population (e.g., a universe of users) and/or location. As used herein, respondent level data is processed viewing data at the level of individual respondents and synthetic respondent level data is estimated/virtual viewing data at the level of virtual individual respondents used to collectively represent the known, aggregate characteristics of an audience. Synthetic respondent level data may include complete synthesized time records (e.g., at the quarter hour level, hour level, etc.) across each broadcasting day of all viewing sessions by individual family member(s) and guest(s) on individual metered media output devices in a home, and include the demographic data. As used herein, designated market area is a geographical area that defines a media market where synthetic respondent level data is produced.

In some examples, media exposure data can be determined for a union of margins and/or events. A margin and/or event may be a sub increment of time (e.g., 15 minute increments of an hour program), a visit to a website from a group of websites, a visit to a store of a chain of stores, an exposure to a television show, radio show, podcast, etc. across different days of a week., an exposure to a television show in a series of shows or in a group of programs for a channel or group of channels, etc. As used herein, a rating is an average percentage of a population exposed to media across a specified time interval (e.g., a margin or event). As used herein, reach is a cumulative percentage or total of a population that has been counted as a viewer of the media at least once during a specified time interval (e.g., hourly, daily, weekly, monthly, etc.). Media exposure data may include a total number of people exposed to the media at the different margins, a total population of audience members exposed to the media at the different margins, a total number of deduplicated people exposed to the media (e.g., an audience reach) from all of the different marginal ratings (e.g., probabilities), and a total population size (e.g., universe estimate) of users that potentially could be exposed to the media. As used herein, a marginal rating corresponds to a probability that a person in the universe of people was exposed to media for a particular duration of time. As used herein, a recorded audience refers to monitored panelists exposed to media and a population audience represents the total population of people (e.g., monitored panelists and other unmonitored media consumers associated with return path data) exposed to the media.

Examples disclosed herein receive marginal media exposure data for different instances of media exposures (e.g., a margin of unions such as people visiting multiple websites, attending different sporting events, watching different episodes of a television series, being exposed to a television show, radio show, podcast, etc. across different days of a week, different weeks of a month, different quarter hour time slots of a television program, etc.) and estimates a population reach across all of the different instances of media exposure based on the marginal media exposure data. Traditional techniques of determining the total population based on marginal media ratings include numerical calculations that enumerate the marginal rating data for all combinations in which someone can watch a program. The number of probabilities to be solved by such traditional techniques is $2^n$ number of probabilities, where n is the number of marginal probabilities provided in the marginal ratings data (e.g., the ratings for the different possible instances of media exposure). For example, if reach is to be calculated across 4 quarter hours (e.g., for an hour-long media exposure), which corresponds to four possible marginal ratings of a one-hour set or union, the total number of probabilities to be solved using such a traditional technique is 16 (e.g., $2^4$). If the reach is to be calculated across 96 quarter hours (e.g., a day-long media exposure), the total number of probabilities to be solved using such a traditional technique is $8*10^{28}$ (e.g., $2^{96}$), thereby exceeding the memory limit and/or processing power of any existing computer. Examples disclosed herein alleviate such memory/processing resource problems associated with such a traditional technique by calculating the solution using a disclosed analytical process.

To estimate the total population reach for a target audience (e.g., an audience with at least some unknown marginal data) across a number of margins (e.g., also referred to as events) making up a set or union (e.g., 15 minute segments of an hour program, websites in a group of websites, days across a week, weeks across a month, etc.), examples disclosed herein assume that the total joint distribution of the margins sums to 100%, the target audience for each of the n events/margins are known as $X_i$, for i={1, 2, ..., n}, and the total deduplicated audience across all n events (e.g., the reach) is known as $X_d$. Examples disclosed herein force a unique solution for the n+2 constraints across the $2^n$ possibilities by solving for a set that has the maximum entropy. The unique solution is shown below in Equations 1-3 in terms of the n+2 variables, one for each constraint.

$$z_0 = 1 - X_d \quad \text{(Equation 1)}$$

$$z_i = \frac{X_i}{Q - X_i} \text{ where } i = \{1, 2, ..., n\} \quad \text{(Equation 2)}$$

$$z_d = \frac{Q - X_d}{1 - X_d} \quad \text{(Equation 3)}$$

In the preceding equations, Q is a pseudo universe estimate. A pseudo universe estimate corresponds to what the size of the universe of individuals capable of being in a given audience would need to be to achieve the ratings and reach values for that audience if the different marginal ratings are assumed to be independent, regardless of how much dependence actually exists. For example, when the universe of a recorded audience is equal to the pseudo universe value, then the total reach of the recorded audience can be calculated from the audience marginal ratings assuming they are independent. However, if there is a difference between the pseudo universe of the recorded (also referred to as monitored) audience and the actual universe of the recorded audience, the audience marginal ratings are dependent. The pseudo universe estimate is defined as a solution to the below Equation 4.

$$1 - \frac{X_d}{Q} = \prod_{i=1}^{n} \left(1 - \frac{X_i}{Q}\right) \quad \text{(Equation 4)}$$

The n+2 variables $z_0$, $z_i$, $z_d$ shown in above Equations 1-3 are the minimum sufficient set to fully specify the joint distribution consistent with all the constraints. A member of the joint distribution of Boolean membership of yes/no per event represented as either $e_i=1$ or $e_i=0$ can be computed using the below Equation 5, which represents the percentage of audience members exposed to media during a first one or more of the events/margins but not during remaining event/margins (e.g., a percentage of audience members exposed to a show during the first and second 15 minute segment but not during the third and fourth 15 minute segment).

$$Aud(e_1 e_2 \ldots e_n) = (Q - X_d) \prod_{e_i=1}^{n} \left(\frac{X_i}{Q - X_i}\right) \quad \text{(Equation 5)}$$

Additionally, the de-duplicated union estimate (e.g., reach estimate) across any set of days, $\Omega$, can be estimated using the below Equation 6.

$$Aud(\Omega) = Q\left(1 - \prod_{i \in \Omega}^{n} \left(1 - \frac{X_i}{Q}\right)\right). \quad \text{(Equation 6)}$$

A joint distribution for a combination can be estimated using the above Equations 5 and 6 if the values of Q, Xd, and Xi are known. Examples disclosed herein determine/estimate audience margin/event totals, audience reach, and/or pseudo universe estimates to be able to estimate joint distribution-based audience metrics and/or reach metrics relating media exposure events/margins across any union.

Examples disclosed herein utilize prior known information of a similar set to predict missing audience event information. The known prior information may be previous equivalent time interface temporal data, panel data for spatial data, etc. Using the prior information, an entire joint distribution across all missing values can be determined, thereby leading to more consistent audience measurement data. For example, daily audiences for a particular show that airs daily may be known for all the days up to the present day, but not known for the rest of the week (e.g., on Wednesday, the daily audience for a daily show is known for Monday, Tuesday, and Wednesday, and unknown for Thursday and Friday). In such an example, the known audience from this week and the known audiences from the previous week can be utilized to estimate the audiences for the upcoming days (e.g., Thursday and Friday), which in turn can be used to calculate a total deduplicated audience total (e.g., a reach total).

If $|Z|$ represents the size of a set/union Z, and Z includes two margins/events (e.g., Z={a, b}, where a and b are events), then $|Z|=2$. Because the set $(\Omega_0)$ and the reach across all events $(X_d)$ are unknown, the below Equations 7-8 represent the system of $|\Omega_0|+1$ equations to be satisfied.

$$\frac{A_i}{Q_A - A_i} = \frac{X_i}{Q_X - X_i} \quad i \in \Omega \quad \text{(Equation 7)}$$

$$\frac{Q_A - A_d}{1 - A_d} = \frac{Q_X - X_d}{1 - X_d} \quad \text{(Equation 8)}$$

In Equations 7-8, $A_i$ is a known total audience percentage for an event i from a known previous set (e.g., a prior week) and $A_d$ is the known reach (e.g., deduplicated audience total) percentage from the known previous set and/or based on known panel data. After the pseudo universe estimate for the known prior/panel audience $(Q_A)$ is solved for, the above system of equations corresponding to Equations 7-8 reduces down to a single unknown pseudo universe estimate for the target audience $(Q_X)$, independent of the number of missing events, which corresponds to the size of set $\Omega_0$. Because the audience totals for the margins in the prior/panel union (Ai) are known for all i={1, 2, ... n}, and also the total deduplicated audience across the margins in the prior union (Ad) is known, the pseudo universe estimate for the known prior audience $(Q_A)$ can be determined directly using the below Equation 9, which corresponds to the above Equation 4 with respect to the known audience for the prior/known/panel union (A).

$$1 - \frac{A_d}{Q_A} = \prod_{i=1}^{n} \left(1 - \frac{A_i}{Q_A}\right) \quad \text{(Equation 9)}$$

After the pseudo universe estimate for the known prior audience $(Q_A)$ is determined, Xi becomes the only unknown variable in Equations 7 and 8, which is simplified in the below Equations 10 and 11.

$$X_i = \left(\frac{Q_X}{Q_A}\right)A_i \quad i\in\Omega_0 \quad \text{(Equation 10)}$$

$$X_i = rA_i \quad \text{(Equation 11)}$$

The above Equations 10 and 11 illustrate that the unknown audiences are proportional to the prior audiences, with the same constant of proportionality throughout. Thus examples disclosed herein define $$r = \left(\frac{Q_X}{Q_A}\right)$$

so that when the pseudo universe estimate for the target audience ($Q_X$) is determined, the ratio of the pseudo universe estimate for the target audience ($Q_X$) to the pseudo universe estimate for the known prior audience ($Q_A$) (e.g., r) is known and the unknown total margin audience for the margins of the target union (Xi) for $i\in\Omega_0$ can be determined.

As shown below, Equation 12 corresponds to the above Equation 10 after dividing both sides by $Q_X$ and subtracting both sides by 1, so that the equations is an expression of unknowns in terms of knowns to connect previous information to help infer the unknown information.

$$1 - \frac{X_i}{Q_X} = 1 - \frac{A_i}{Q_A} \quad i\in\Omega_0 \quad \text{(Equation 12)}$$

The above Equation 12 can be utilized in conjunction with the above Equation 4, corresponding to the below Equations 13-15.

$$1 - \frac{X_d}{Q_X} = \prod_{i=1}^{n}\left(1 - \frac{X_i}{Q_X}\right) \quad \text{(Equation 13)}$$

$$1 - \frac{X_d}{Q_X} = \prod_{i\in\Omega_0}^{n}\left(1 - \frac{x_i}{Q_X}\right)\prod_{i\in\Omega_1}^{n}\left(1 - \frac{X_i}{Q_X}\right) \quad \text{(Equation 14)}$$

$$1 - \frac{X_d}{Q_X} = \prod_{i\in\Omega_0}^{n}\left(1 - \frac{A_i}{Q_A}\right)\prod_{i\in\Omega_1}^{n}\left(1 - \frac{X_i}{Q_X}\right) \quad \text{(Equation 15)}$$

In Equation 15, the variables in the first product are all known and the first product is equal to some scalar value. In the second product, only the pseudo universe estimate for the target audience ($Q_X$) is unknown as the unknown total margin audience for the margins of the target union ($X_i$) for $i\in\Omega_1$ are all known. Examples disclosed herein can use Equation 8 to solve for the deduplicated audience (e.g., reach) for the target union (Xd), as shown below in Equation 16.

$$X_d = \frac{Q_A - Q_X + A_d(Q_X - 1)}{Q_A - 1} \quad \text{(Equation 16)}$$

Equation 16 can be substituted into Equations 13-15 and simplified into one equation with one unknown, which can be used to for the pseudo universe estimate for the target audience $Q_X$, represented below in Equations 17.

$$c_0\left(1 - \frac{1}{Q_X}\right) = (c_1)\prod_{i\in\Omega_1}^{n}\left(1 - \frac{X_i}{Q_X}\right) \quad \text{(Equation 17)}$$

In Equation 17, $c_0$ and $c_1$ are audience constants, which are known when the pseudo universe estimate for the known prior audience ($Q_A$) is determined, as shown below in Equations 18 and 19.

$$c_0 = \frac{Q_A - A_d}{Q_A - 1} \quad \text{(Equation 18)}$$

$$c_1 = \prod_{i\in\Omega_0}^{n}\left(1 - \frac{A_i}{Q_A}\right) \quad \text{(Equation 19)}$$

After the pseudo universe estimate for the target audience ($Q_X$) is solved, examples disclose herein use Equation 16 to determine the deduplicated audience (e.g., reach) for the target union (Xd) and use Equation 10 to determine the unknown total margin audience for the margins of the target union (Xi). From there, examples disclosed herein can determine the entire joint distribution across any event(s) within a set. For example, if the total measured audience of a daily show for a target week is known for the first 3 days and unknown for the last two days, and the audience totals for last week audience for the same show is known. Examples disclosed herein can determine the pseudo universe estimate for the known prior audience ($Q_A$) based on Equation 9, the audience constants ($c_0$, $c_1$) using Equations 18 and 19, the pseudo universe estimate for the target audience ($Q_X$) using Equation 17, the unknown total margin audience for the margins of the target union (Xi) using Equation 10, and the deduplicated audience (e.g., reach) for the target union (Xd) using Equation 16. After the set of missing Xi (e.g., the audience for the last two days of the show), the deduplicated audience (e.g., reach) for the target union (Xd), and pseudo universe estimate for the target audience ($Q_X$) are determined (e.g., estimated), examples disclosed herein can determine various information regarding the joint distribution using Equations 5 and 6. For example, examples disclosed herein can determine the total deduplicated audience (reach) for the any group of days within the week, predictions of the audience for the remaining two days, predicted total deduplicated audience for the entire week, a predicted total deduplicated audience who was exposed on the first day and not on the remaining days, etc. Although the above Equations are based on percentage of audience with respect to a universe estimate, the above Equations may be formulated with respect to the total audience numbers (e.g., where '1' is replaced with the universe audience estimate).

Figure 1:
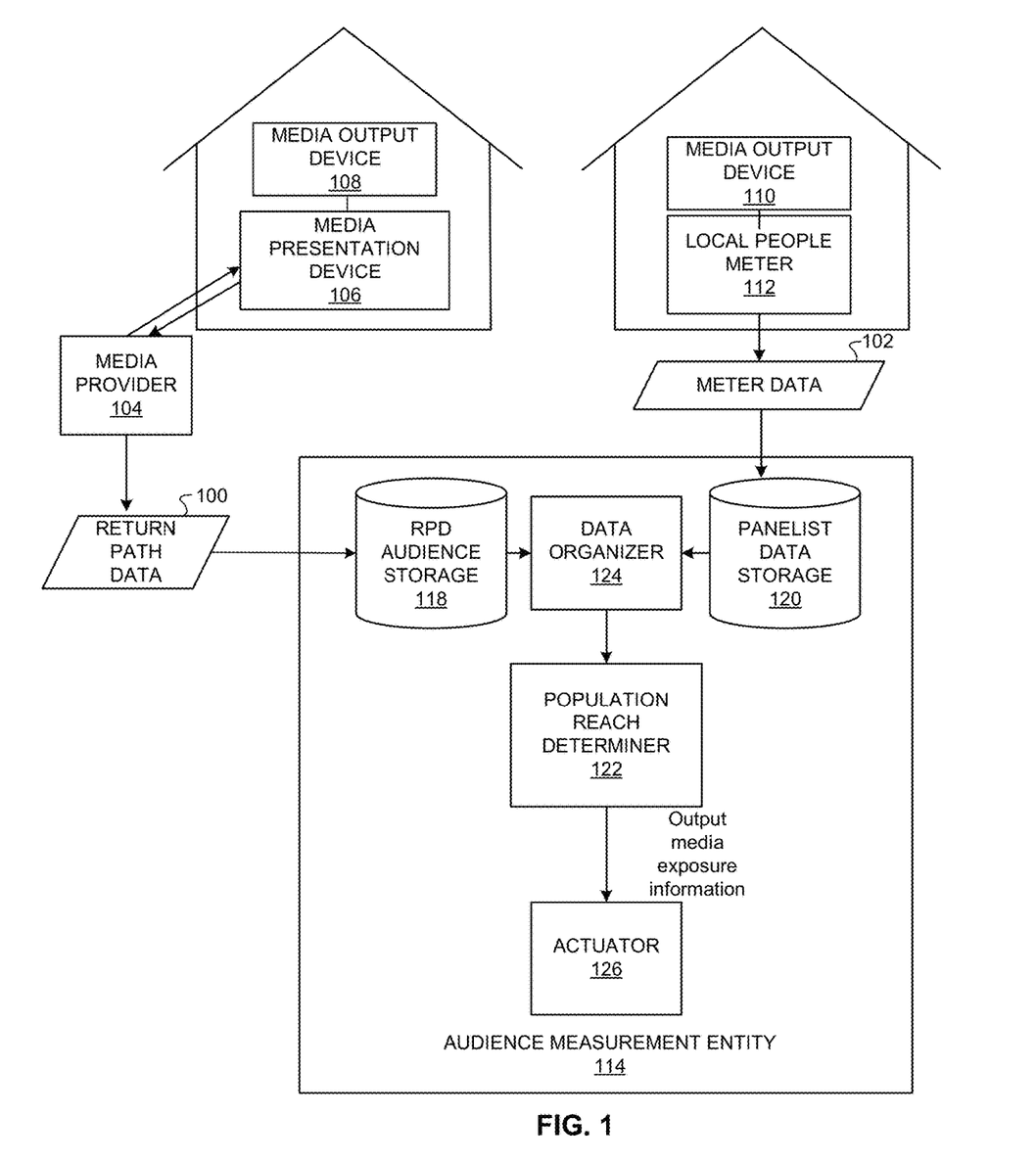
FIG. 1 is a block diagram of an example environment including a population reach determiner to estimate population reach from marginal ratings with missing information.

FIG. 1 is a block diagram of an environment in which example return path data 100 and example meter data 102 are collected to determine reach based on marginal ratings data. FIG. 1 includes the example return path data 100, the example meter data 102, an example media provider 104, an example media presentation device 106, example media output devices 108, 110, an example local people meter (LPM) 112, and an example audience measurement entity (AME) 114. The example audience measurement entity 114 includes an example return path data (RPD) audience storage 118, an example panelist data storage 120, an example population reach determiner 122, an example data organizer 124, and an example actuator 126.

The example media provider 104 of FIG. 1 is a service provider (e.g., cable media service provider, a radio frequency (RF) media provider, a satellite media service provider, etc.) that provides media to an audience member for presentation via the example media presentation device 106. The media provided by the example media provider 104 is transmitted (e.g., via a wired or wireless network connection) to the media presentation device 106. The media presentation device 106 is connected, via a wired or wireless connection, to the example media output device 108 to output the media to an audience member. The media output device 108 is a device capable of outputting the received media. For example, the media output device 108 may be a television, a radio, speakers, a projector, a computer, a computing device, a tablet, a mobile device, and/or any other device capable of outputting media.

When the example media presentation device 106 of FIG. 1 is on, the media presentation device 106 receives media corresponding to a station, program, website, etc., based on the tuning of the example media presentation device 106. For example, the media presentation device 106 may be a set-top box. Additionally or alternatively, the example media presentation device 106 may be an over the top device, a video game console, a digital video recorder (DVR), a digital versatile disc (DVD) player, a receiver, a router, a server, a computer, a mobile device, and/or any device that receives media from a service provider. In some examples, the media presentation device 106 may implement a DVR and/or DVD player. In some examples, the example media presentation device 106 includes a unique serial number that, when associated with subscriber information, allows an audience measurement entity, a marketing entity, and/or any other entity to ascertain specific subscriber behavior information.

By way of example, the example media presentation device 106 may be tuned to channel 5. In such an example, the media presentation device 106 outputs media (from the example media provider 104) corresponding to the tuned channel 5. The media presentation device 106 may gather tuning data corresponding to which channels, stations, websites, etc., that the example media presentation device 106 was tuned. The example media presentation device 106 generates and transmits the example return path data 100 to the example media provider 104. The example return path data 100 includes the tuning data and/or data corresponding to the example media provider 104. Although the illustrated example of FIG. 1 includes the example media provider 104 receiving the example return path data 100 from one media presentation device (e.g., the example media presentation device 106), at one location, corresponding to one media provider (e.g., the example media provider 104), the example media provider 104 may receive return path data 100 from any number or type(s) of media presentation devices, at any number of locations. The media provider 104 transmits the collected return path data 100 to the example audience measurement entity 114. Additionally or alternatively, the audience measurement entity 114 may be hosted by any other entity or may be co-hosted by another entity (ies). For example, the example return path data 100 may be collected from the example media presentation devices 106 by a media provider (e.g., a cable television provider, a satellite television provider, etc.) and the example meter data 102 may be collected from an LPM (e.g., such as the example LPM 112) by the example audience measurement entity 114 cooperating with the media provider to gain access to the tuning data.

The example media output device 110 of FIG. 1 is a device capable of outputting the received media. For example, the media output device 110 may be a television, a radio, speakers, a projector, a computer, a computing device, a tablet, a mobile device, and/or any other device capable of outputting media. In some examples, the media output device 110 receives media over-the-air. In this manner, the media output device 110 receives media via an antenna and does not correspond to a media provider (e.g., including the example media provider 104). In the illustrated example of FIG. 1, the media output device 110 corresponds to one or more monitored panelists. The example LPM 112 monitors the panelists exposure to media output by the example media output device 110. For example, the example LPM 112 is in communication with the example media output device 110 to collect and/or capture signals emitted externally by the media output device 110. The LPM 112 may be coupled with the media output device 110 via wired and/or wireless connection. The example LPM 112 may be implemented in connection with additional and/or alternative types of media presentation devices, such as, for example, a radio, a computer monitor, a video game console, and/or any other device capable to present media to a user. The LPM 112 may be a portable people meter, a cell phone, a computing device, a sensor, and/or any other device capable of metering (e.g., monitoring) user exposure to media. In some examples, a media presentation location may include a group of LPMs 112. In such examples, the group of the LPMs 112 may be used to monitor media exposure for multiple users and/or media output devices 110. Additionally, the example panelist data storage 120 receives and stores the example meter data 102 from the example LPM 112.

In some examples, the example LPM 112 of FIG. 1 includes a set of buttons assigned to audience members to determine which of the audience members is watching the example media output device 110. The LPM 112 may periodically prompt the audience members via a set of LEDs, a display screen, and/or an audible tone, to indicate that the audience member is present at a first media presentation location by pressing an assigned button. In some examples, to decrease the number of prompts and, thus, the number of intrusions imposed upon the media consumption experience of the audience members, the LPM 112 prompts only when unidentified audience members are located at the first media presentation location and/or only after the LPM 112 detects a channel change and/or a change in state of the media output device 110. In other examples, the LPM 112 may include at least one sensor (e.g., a camera, 3-dimensional sensor, etc.) and/or be communicatively coupled to at least one sensor that detects a presence of the user in a first example media presentation location. The example LPM 112 transmits the example meter data 102 to a media researcher and/or a marketing entity. The example meter data 102 includes the media presentation data (e.g., data related to media presented while the media output device 110 is on and a user is present). The example meter data 102 may further include a household identification, a tuner key, a presentation start time, a presentation end time, a channel key, etc. Although the illustrated example illustrates the example audience measurement entity 114 collecting the example meter data 102 from one LPM 112 at one location, the example audience measurement entity 114 may collect meter data from any number or type of meters at any number of locations.

The example return path data 100 of FIG. 1 from the example media presentation device 106 and/or the example meter data 102 from the example LPM 112 is/are transmitted to the example audience measurement entity 114 via a network. The network may be implemented using any type of public or private network, such as, but not limited to, the Internet, a telephone network, a local area network (LAN), a cable network, and/or a wireless network. To enable communication via the network, the example media presentation device 106 includes a communication interface that enables a connection to an Ethernet network, a digital subscriber line (DSL), a telephone line, a coaxial cable, or any wireless connection, etc.

The example audience measurement entity 114 of FIG. 1 includes the example return path data audience storage 118 (e.g., a database) to store RPD audience information and the example panelist data storage 120 (e.g., a database) to store panelist information. In some examples, an example data organizer 124 of the audience measurement entity 114 may process the RPD data in the RPD audience storage 118 and/or the panelist data in the panelist data storage 120 to organize the data (e.g., group marginal data into unions) based on instructions from a user and/or manufacturer. In some examples, the example data organizer 124 of the audience measurement entity 114 groups data together based on the information being processed by the population reach determiner 122. For example, if the population reach determiner 122 is processing media exposure data corresponding to seven different margins of a union, the example data organizer 124 may obtain known data for a different union similar to the seven margins (e.g., seven previous margins of a previous union, panel data for seven margins, etc.). Additionally, the example data organizer 124 can organize the data from the panelist data storage 120 to determine recorded audience marginal ratings for the different marginals of a given media. For example, the data organizer 124 can organize the data from the example panelist data storage 120 to identify the number or percentage of the panelists that were exposed to media during different margins of a union of margins.

The example population reach determiner 122 of FIG. 1 receives the recorded audience marginal ratings (e.g., from the meter data 102) for at different marginals (e.g., quarter hours, half hours, hours, days, etc.) of given media, the population marginal ratings (e.g., from the return path data 100) for the different marginals of the media, and/or the total reach (e.g., from the meter data 102) for the recorded audience and a total population size (e.g., the actual universe estimate) from one or more devices. Additionally, the example population reach determiner 122 can estimate and/or determine audience totals for unknown (e.g., future) margins/events based on the prior events or a union including the future margin/events and/or prior events of a previous union not including the future margin/events. In this manner, the example population reach determiner 122 can determine any information corresponding to the joint distribution of the audience of media corresponding to margins/events (e.g., days) of a union of events (e.g., a week). The example population reach determiner 122 outputs the reach output and/or other joint distribution information corresponding to media exposure to another device and/or user. In some examples, the population reach determiner 122 outputs the reach output and/or other joint distribution information corresponding to media exposure to the example actuator 126. The example actuator 126 of FIG. 2 performs an action based on the report. For example, the actuator 126 may (a) target an advertisement for an individual and/or group of people based on the report, (b) select a commercial or advertisement for a particular region based on the report, etc. The example population reach determiner 122 is further described in conjunction with FIG. 2.

Figure 2:
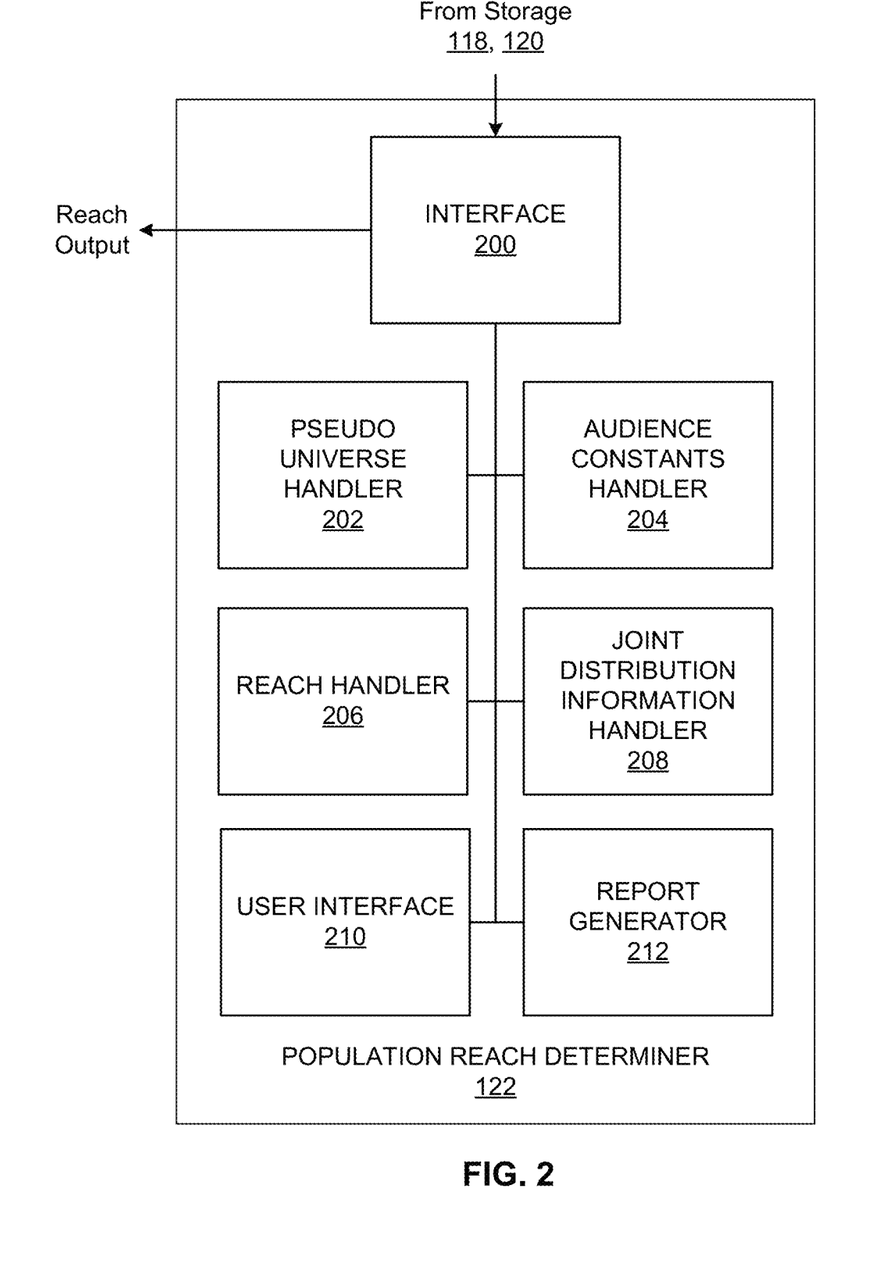
FIG. 2 is a block diagram of an example implementation of a population reach determiner of FIG. 1.

FIG. 2 is a block diagram of an example implementation of the example population reach determiner 122 of FIG. 1 to determine population reach for given media based on marginal ratings data. The example population reach determiner 122 of FIG. 2 includes an example interface(s) 200, an example pseudo universe calculator 202, an example audience constants hander 204, an example reach calculator 206, an example joint distribution information calculator 208, and an example user interface 210. Although the example population reach determiner 122 is described in conjunction data generated with a first union of margins with unknown data and a second prior union of margins with known data, the example population reach determiner 122 may determine reach based on any type of similar margin/union data (e.g., panelist data, survey data, etc.). Additionally, although FIG. 2 is described in conjunction with audience count for media events across a union (e.g., weekly episodes across a season, daily shows across a week, etc.), the example population reach determiner 122 may determine reach from different programs, stores visits for different stores, website visits, etc.

The example interface(s) 200 of FIG. 2 receives audience marginal ratings corresponding to media for two or more margins (e.g., the same show at different days across a week) corresponding to a target union that is missing audience information for one or more markings (e.g., total audience is known for Monday, Tuesday, and Wednesday, but unknown for Thursday and Friday). Additionally, the example interface(s) 200 obtains known marginal information corresponding to similar marginal information (e.g., known audience totals and/or reach from a prior week, known audience totals and/or reach corresponding to panelist data, etc.) and/or a universe estimate of users.

The example pseudo universe calculator 202 of FIG. 2 determines pseudo universe estimates as part of a process to determine population reach. As described above, a pseudo universe corresponds to what the size of the universe of individuals capable of being in a given audience would need to be to achieve the ratings and reach values for that audience if the different marginal ratings are assumed to be independent, regardless of how much dependence actually exists. The example pseudo universe calculator 202 determines the pseudo universe estimate for a set of data with known information (e.g., a prior union corresponding to the target union or panelist data corresponding to the target union) ($Q_A$) by solving the above Equation 9 based on the total audience for the margins (Ai) and the reach across the margins in the union (Ad). The example pseudo universe calculator 202 determines the pseudo universe estimate for a set of data with unknown information ($Q_X$) by solving the above Equation 17 based on audience constants (e.g., determined by the audience constants calculator 204). In some examples, the pseudo universe calculator 202 can be implemented by a pseudo universe controller. For example, the pseudo universe calculator 202, when implemented as a pseudo universe controller, can be implemented as hardware, firmware, and/or software.

The example audience constants calculator 204 of FIG. 2 determines audience constants as part of a process to determine population reach. The example audience constants calculator 204 determines the audience constants ($c_0$, $c_1$) by solving the above Equations 18 and 19 based on the pseudo universe estimate of for the union with the known information ($Q_A$), the reach of the audience for the union with the known information (Ad), and the individual margin totals for the union with the known information (Ai). In some examples, the audience constants calculator 204 can be implemented by an audience constants controller. For example, the audience constants calculator 204, when implemented as an audience constants controller, can be implemented as hardware, firmware, and/or software.

The example reach calculator 206 of FIG. 2 generates a reach estimate for the union with the unknown information ($X_d$). As described above, the reach is a deduplicated total audience corresponding to the total audience of given media who contributed to at least one of the different marginal ratings of the media. The example reach calculator 206 determines the reach by first estimating the audience totals for the unknown margins in the union with missing information ($X_i$). The example reach calculator 206 determines the audience total estimates using the above Equation 10 based on the pseudo universe estimates ($Q_X$ and $Q_A$) and the marginal ratings for the union of the known information ($A_i$). The example reach calculator 206 determines the total reach ($X_d$) using the above Equation 16 using the estimated audience totals for the unknown margins in the union with missing information (Xi). In some examples, the reach calculator 206 can be implemented by a reach controller. For example, the reach calculator 206, when implemented as a reach controller, can be implemented as hardware, firmware, and/or software.

The example joint distribution information calculator 208 of FIG. 2 determines joint distribution information regarding the margins and/or unions based on user preferences. The example joint distribution information calculator 208 determines the joint distribution information based on one or more of the above Equations 5 and/or 6. For example, the example joint distribution information calculator 208 may determine the total deduplicated audience (reach) for any group of days within the week, predictions of the audience for the remaining two days, predicted total deduplicated audience for the entire week, a predicted total deduplicated audience who was exposed on the first day and not on the remaining days, etc., based on instructions and/or preferences from a user. The example user interface 210 may interface with the user to obtain the preferences and/or instructions from the user. In some examples, the joint distribution information calculator 208 can be implemented by a joint distribution information controller. For example, the joint distribution information calculator 208, when implemented as a joint distribution information controller, can be implemented as hardware, firmware, and/or software.

While an example manner of implementing the example audience measurement entity 114 and/or the example population reach determiner 122 of FIG. 1 is illustrated in FIGS. 1 and/or 2, one or more of the elements, processes and/or devices illustrated in FIGS. 1 and/or 2 may be combined, divided, re-arranged, omitted, eliminated and/or implemented in any other way. Further, the example data organizer 124, the example actuator 126, the example interface 200, the example pseudo universe calculator 202, the example audience constants calculator 204, the example reach calculator 206, the example joint distribution information calculator 208, the example user interface 210, the example report generator 212 and/or, more generally, the example population reach determiner 122 of FIG. 1 and/or. 2 may be implemented by hardware, software, firmware and/or any combination of hardware, software and/or firmware. Thus, for example, any of the example data organizer 124, the example actuator 126, the example interface 200, the example pseudo universe calculator 202, the example audience constants calculator 204, the example reach calculator 206, the example joint distribution information calculator 208, the example user interface 210, the example report generator 212 and/or, more generally, the example population reach determiner 122 of FIGS. 1 and/or 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data organizer 124, the example actuator 126, the example interface 200, the example pseudo universe calculator 202, the example audience constants calculator 204, the example reach calculator 206, the example joint distribution information calculator 208, the example user interface 210, and/or the example report generator 212 is/are hereby expressly defined to include a non-transitory computer readable storage device or storage disk such as a memory, a digital versatile disk (DVD), a compact disk (CD), a Blu-ray disk, etc. including the software and/or firmware. Further still, the example population reach determiner 122 of FIG. 1 may include one or more elements, processes and/or devices in addition to, or instead of, those illustrated in FIGS. 1 and/or 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
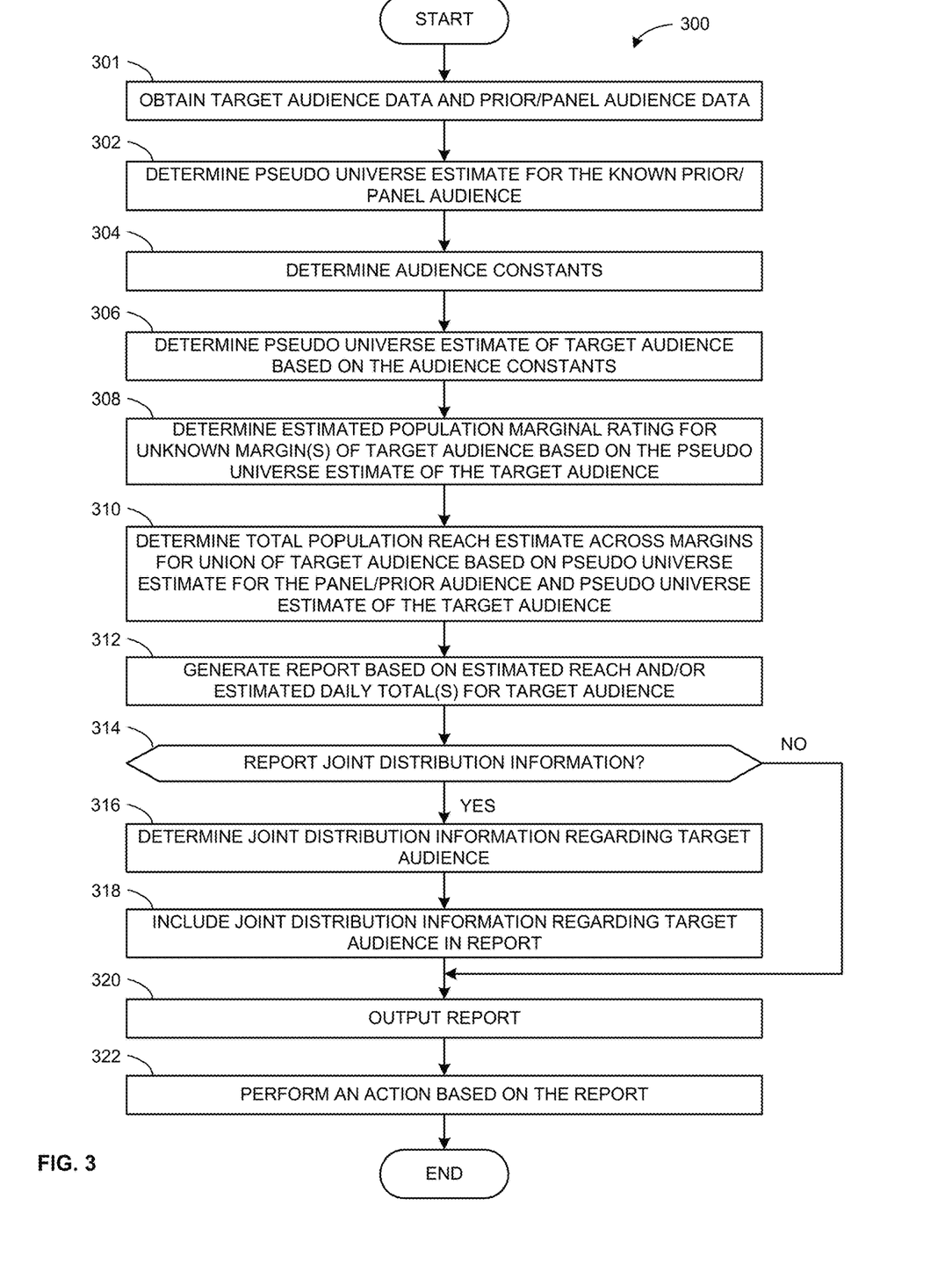
FIG. 3 is a flowchart illustrating example machine readable instructions that may be executed to implement the example population reach determiner of FIGS. 1 and/or 2.

A flowchart representative of example hardware logic, machine readable instructions, hardware implemented state machines, and/or any combination thereof for implementing the example audience measurement entity 114 and/or the population reach determiner 122 of FIGS. 1 and/or 2 is shown in FIG. 3. The machine readable instructions may be one or more executable programs or portion(s) of an executable program for execution by a computer processor such as the processor 412 shown in the example processor platform 400 discussed below in connection with FIG. 4. The program may be embodied in software stored on a non-transitory computer readable storage medium such as a CD-ROM, a floppy disk, a hard drive, a DVD, a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowchart illustrated in FIG. 3, many other methods of implementing the example audience measurement entity 114 population reach determiner 122 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example process of FIG. 3 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 3 is an example flowchart representative of example machine readable instructions 300 that may be executed by the example population reach determiner 122 of FIGS. 1 and 2 to generate a total audience reach from different marginals (e.g., daily episodes) over a union of time (e.g., week) and/or joint distribution information corresponding to a target audience. The instruction 300 of FIG. 3 are described in conjunction with (A) an example target audience for a daily television show, where the total audience (e.g., represented in percentages of the universe estimate) for Monday, Tuesday, and Wednesday are known and the total audience for Thursday and Friday are unknown (e.g., X={0.32, 0.35, 0.21, $X_4$, $X_5$}), (B) a prior/panel audience for the daily television show, where the total audience for each day is known (e.g., A={0.38, 0.30, 0.27, 0.40, 0.32}), and a weekly deduplicated total audience for the prior/panel audience for margins across the known union is known (e.g., $A_d$=0.45). Although the instructions 300 of FIG. 3 are described in conjunction with daily marginals of media exposure to a television show over a duration of a week performed by the example population reach determiner 122 of FIGS. 1 and 2, the example instructions may be utilized to determine media exposure data based on any type of media and/or marginal for any union of margins.

At block 301, the example interface 200 obtains the target audience data (e.g., $X_i$) and the prior/panel audience data (e.g., $A_i$ and $A_d$). For example, the interface 200 may obtain the target audience data of $X_i=\{0.32, 0.35, 0.21, X_4, X_5\}$ from the RPD audience storage 118 representing known audience totals for Monday ($X_1$), Tuesday ($X_2$), and Wednesday ($X_3$) and unknown audience totals for Thursday ($X_4$) and Friday ($X_5$). Additionally, the interface 200 may obtain the prior/panel audience data of A={0.38, 0.30, 0.27, 0.40, 0.32} and the reach of the prior/panel audience data of $A_d$=0.45 from the RPD audience storage 188 and/or the panelist data storage 120.

At block 302, the example pseudo universe calculator 202 determines the pseudo universe estimate for the known prior/panel audience ($A_i$). As described above, a pseudo universe corresponds to what the size of the universe of individuals capable of being in a given audience would need to be to achieve the ratings and reach values for that audience if the different marginal ratings are assumed to be independent, regardless of how much dependence actually exists. The example pseudo universe calculator 202 determines the pseudo universe estimate for a set of data with known information (e.g., a prior union corresponding to the target union or panelist data corresponding to the target union) ($Q_A$) by solving the above Equation 9 based on the total audience for the margins ($A_i$) and the reach across the margins in the union (AD). Accordingly, the example pseudo universe calculator 202 determines the pseudo universe estimate for the known prior/union panel audience ($Q_A$) to be 0.450304 by solving the equation $$1 - \frac{0.45}{Q_A} = \left(1 - \frac{0.38}{Q_A}\right)\left(1 - \frac{0.30}{Q_A}\right)\left(1 - \frac{0.27}{Q_A}\right)\left(1 - \frac{0.40}{Q_A}\right)\left(1 - \frac{0.32}{Q_A}\right).$$

At block 304, the example audience constants calculator 204 determines the audience constants based on the prior/panel known audience data. For example, the audience constants calculator 204 determines the audience constants ($c_0, c_1$) by solving the above Equations 18 and 19 based on the pseudo universe estimate of for the union with the known information ($Q_A$), the reach of the audience for the union with the known information (Ad), and the individual margin totals for the union with the known information (Ai). Accordingly, the example audience constants calculator 204 determines the audience constants for the known prior/union panel audience ($c_0, c_1$) to be $$c_0 = -0.000552542 \left(\text{e.g., } c_0 = \frac{0.450304 - 0.45}{0450304 - 1}\right) \text{ and } c_1 =$$

$$0.0323256\left(c_2 = \left(1 - \frac{0.38}{0.450304}\right)\left(1 - \frac{0.30}{0.450304}\right)\left(1 - \frac{0.27}{0.450304}\right)\left(1 - \frac{040}{0.450304}\right)\left(1 - \frac{0.32}{0.450304}\right)\right).$$

At block 306, the example pseudo universe calculator 202 determines the pseudo universe estimate of the target audience based on the audience constants. The example pseudo universe calculator 202 determines the pseudo universe estimate for the target audience (e.g., a set of data with unknown information) ($Q_X$) by solving the above Equation 17. For example, the pseudo universe calculator 202 determines the pseudo universe estimate for the target audience to be Qx=0.426952 by solving the equation $$(0.000552542)\left(1 - \frac{1}{Q_X}\right) = (0.0323256)\left(1 - \frac{0.32}{Q_X}\right)\left(1 - \frac{0.35}{Q_X}\right)\left(1 - \frac{0.21}{Q_X}\right).$$

At block 308, the example reach calculator 206 determines the estimated population unknown marginal ratings ($X_4, X_5$) for the target audience based on the pseudo universe estimate of the target audience. The example reach calculator 206 determines the marginal population estimate for the target audience by solving the above Equation 10. For example, the reach calculator 206 determines the marginal population estimate for the target audience to be $$X_4 = 0.379257 \left(\text{e.g., } X_4 = \left(\frac{0.426952}{0.450304}\right)(0.40)\right) \text{ and } X_5 =$$

$$0.303405\left(\text{e.g., } X_5 = \left(\frac{0.426952}{0.450304}\right)(0.32)\right).$$

At block 310, the example reach calculator 206 determines the total population reach estimate (e.g., the total audience) for the target audience across the margins of the union ($X_d$) based on the pseudo universe estimate for the pane/prior audience and the pseudo universe estimate for the target audience. The example reach calculator 206 determines the total reach ($X_d$) using the above Equation 16 using the estimated audience totals for the unknown margins in the union with missing information ($X_i$). For example, the reach calculator 206 determines the reach for the target audience across the margins to be $$X_d = 0.426635 \left(\text{e.g., } X_d = \frac{0.450304 - 0.426952 + 0.45(0.426952 - 1)}{0.450304 - 1}\right).$$

At block 312, the example report generator 212 generates a report based on the estimate reach for the target audience ($X_d$) and/or the estimated daily total(s) ($X_4, X_5$) for the target audience. At block 314, the example report generator 212 determines if the report should include joint distribution information. For example, the user interface 210 may obtain instructions and/or preferences from a user to provide various joint distribution information, including the total deduplicated audience (reach) for the any group of days within the week, predictions of the audience for the remaining two days, predicted total deduplicated audience for the entire week, a predicted total deduplicated audience who was exposed on the first day and not on the remaining days, etc. If the example report generator 212 determines that joint distribution information should not be included in the report (block 314: NO), control continues to block 320, as further described below.

If the example report generator 212 determines that joint distribution information should be included in the report (block 314: YES), the example joint distribution information calculator 208 determines the joint distribution information regarding the target audience based on the joint distribution information to be included (e.g., based on any one of Equations 5 and/or 6) (block 318). For example, if the user interface 210 receives a request to determine the deduplicated total audience across the known audience totals (e.g., Monday, Wednesday, and Friday) for the target audience, the joint distribution information calculator 208 determines the percentage of total audience with respect to the universe estimate for the first three days to be 0.417156 using Equation 5

$$\left(\text{e.g., } Aud(\{1, 2, 3\}) = \right.$$
$$\left. 0.426952\left(1 - \left(1 - \frac{0.32}{0.426952}\right)\left(1 - \frac{0.35}{0.426952}\right)\left(1 - \frac{0.21}{0.426952}\right)\right)\right).$$

If the user interface 210 receives a request to determine the predicted audience totals for Thursday and Friday for the target audience, the joint distribution information calculator 208 includes the determined $X_4$ and $X_5$ values determined at block 308. If the user interface 210 receives a request to determine the deduplicated total audience across the entire week for the target audience, the joint distribution information calculator 208 determines the percentage of total audience with respect to the universe estimate for the week to be Xd determined at block 310. If the user interface 210 receives a request to determine the audience who watched on Monday but stopped watching for the rest of the week, the joint distribution information calculator 208 determines the percentage of audience with respect to the universe estimate for Monday and not the rest of the days of the week to be 0.000947369 using Equation 6

$$\left(\text{e.g., } Aud([10000]) = (0.426952 - 0.426635)\left(\frac{0.32}{0.426952 - 0.32}\right)\right).$$

If the user interface 210 receives a request to determine the total audience who watched on Monday or Friday, the joint distribution information calculator 208 determines the percentage of audience with respect to the universe estimate for Monday or Friday to be 0.396 using Equation 6

$$\left(\text{e.g., } Aud(\{1, 5\}) = 0.426952\left(1 - \left(1 - \frac{0.32}{0.426952}\right)\left(1 - \frac{0.30}{0.426952}\right)\right)\right).$$

Figure 4:
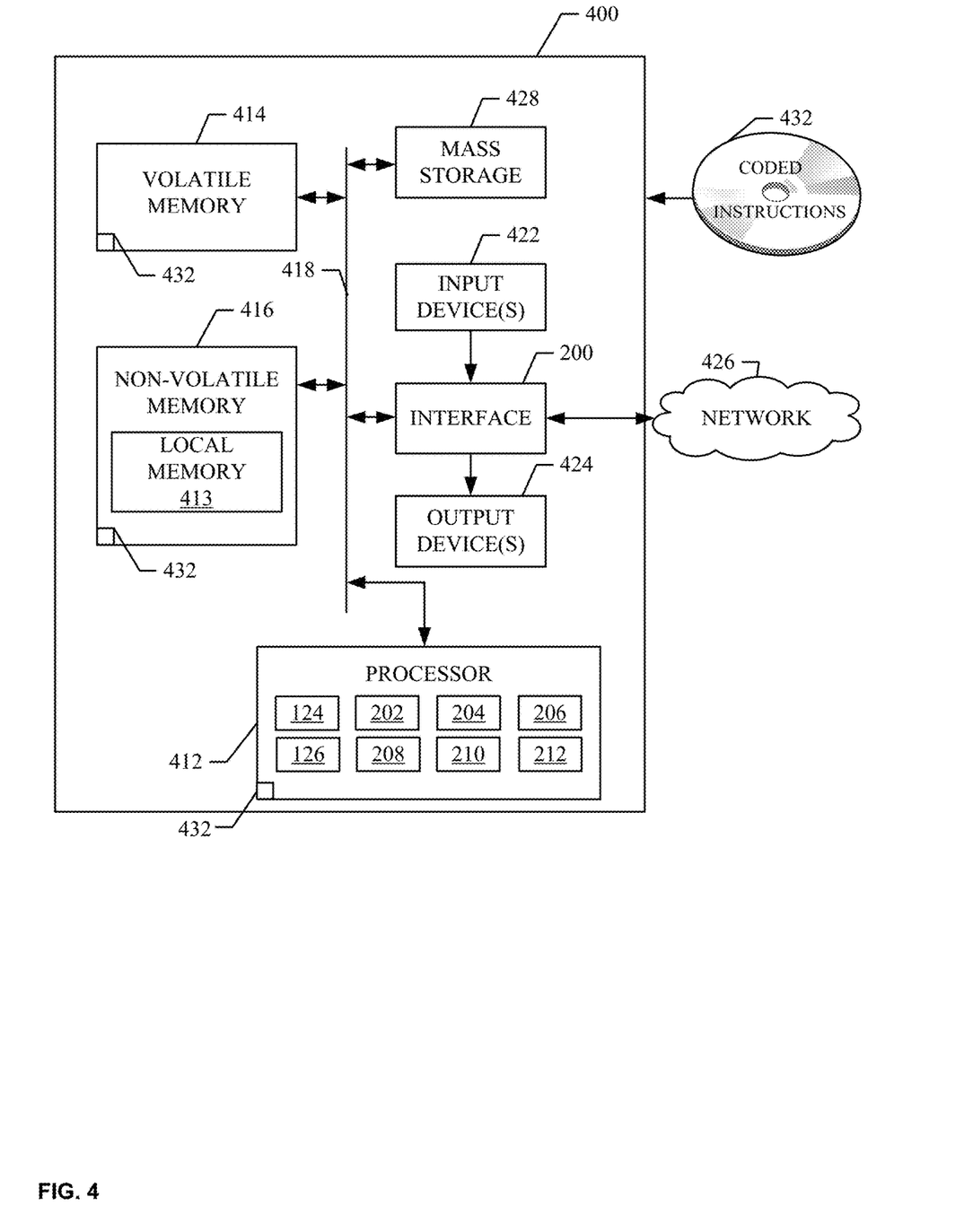
FIG. 4 is a block diagram of an example processing system structured to execute the example machine readable instructions of FIG. 3 to implement the example population reach determiner of FIGS. 1 and/or 2.

At block 318, the example report generator 212 includes the determined joint distribution information regarding the target audience in the report. At block 320, the example interface 200 outputs the generated report to the example actuator 126. In some examples, the example interface 200 may additionally or alternatively output the generated report to storage, the user interface 210, and/or any other device. At block 322, the example actuator 126 performs an action based on the report. For example, the actuator 126 may (a) target an advertisement for an individual and/or group of people based on the report, (b) select a commercial or advertisement for a particular region based on the FIG. 4 is a block diagram of an example processor platform 400 structured to execute the instructions of FIG. 3 to implement the audience measurement entity 114 and/or the population reach determiner 122 of FIGS. 1 and/or 2. The processor platform 400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 400 of the illustrated example includes a processor 412. The processor 412 of the illustrated example is hardware. For example, the processor 412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data organizer 124, the example actuator 126, the pseudo universe calculator 202, the audience constants calculator 204, the reach calculator 206, the joint distribution information calculator 208, the user interface 210, and the report generator 212.

The processor 412 of the illustrated example includes a local memory 413 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 200. The interface circuit 200 may be implemented by any type of interface standard, such as an Ethernet interface, a universal serial bus (USB), a Bluetooth® interface, a near field communication (NFC) interface, and/or a PCI express interface.

In the illustrated example, one or more input devices 422 are connected to the interface circuit 200. The input device (s) 422 permit(s) a user to enter data and/or commands into the processor 412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 424 are also connected to the interface circuit 200 of the illustrated example. The output devices 424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 200 of the illustrated example, thus, typically includes a graphics driver card, a graphics driver chip and/or a graphics driver processor.

The interface circuit 200 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 400 of the illustrated example also includes one or more mass storage devices 428 for storing software and/or data. Examples of such mass storage devices 428 include floppy disk drives, hard drive disks, compact disk drives, Blu-ray disk drives, redundant array of independent disks (RAID) systems, and digital versatile disk (DVD) drives.

The machine executable instructions 432 of FIG. 3 may be stored in the mass storage device 428, in the volatile memory 414, in the non-volatile memory 416, and/or on a removable non-transitory computer readable storage medium such as a CD or DVD.

From the foregoing, it should be appreciated that the above disclosed methods, apparatus, and articles of manufacture estimate population reach from marginal ratings with missing information. Example disclosed herein determine the reach of a target audience analytically using the above Equations 9, 10, 16, 17, 18, and/or 19 and determine joint distribution information corresponding to the target audience using Equations 5 and/or 6. Traditional techniques for determining reach from different margins include determining the reach numerically. However, such traditional techniques are unsolvable for a large number of margins dues to memory and/or processing constraints. For example, enumerating all the results over 50 days would require 2^50 calculations to enumerate a joint distribution for the 50 days, which is requires more storage than is available on any known computer. Examples disclosed herein alleviate the problems associated with such traditional techniques by determining the reach analytically (e.g., via solving the disclosed Equations), thereby saving computing resources and memory and providing the ability to solve systems that traditional computers could not solve. Using examples disclosed herein reach can be determined from a nearly infinite number of margins. Additionally, some traditional techniques result in solutions that are not logical (e.g., reach larger than the universe estimate) for particular examples (e.g., small number of calculations, large number of calculations, etc.). Examples disclosed herein does not result in inconsistent or illogical results for different situations, including situations that correspond to illogical results from some traditional techniques. Additionally, examples disclosed herein include an actuate to perform an action based on the determined reach data including selected a target advertisement or media based on the report. Accordingly, the disclosed methods, apparatus and articles of manufacture are accordingly directed to one or more improvement(s) in the functioning of a computer.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

The invention claimed is:

1. A computing system comprising a processor and a memory, the computing system configured to perform a set of acts comprising:
   determining a first ratings-independent universe estimate for a first audience total corresponding to a first union of a first piece of media and a second piece of the media, a first individual audience of the first piece of media to be known and a second individual audience of the second piece of the media to be known;
   determining a second ratings-independent universe estimate for a second audience total corresponding to a second union of a third piece of the media and a fourth piece of the media, the determination of the second ratings-independent universe estimate based on an audience constant, at least one of the third piece of the media or the fourth piece of the media corresponding to an unknown audience portion included in the second audience total of the media; and
   determining an estimate of the unknown audience portion based on the second ratings-independent universe estimate for the second audience total.

2. The computing system of claim 1, wherein the set of acts further comprises generating a report based on the estimate of the unknown audience portion.

3. The computing system of claim 2, wherein the set of acts further comprises outputting the report.

4. The computing system of claim 1, wherein the set of acts further comprises determining the audience constant based on the first ratings-independent universe estimate, a reach of the first union, or respective known audience totals corresponding to the first piece of the media and the second piece of the media.

5. The computing system of claim 1, wherein determining the first ratings-independent universe estimate comprises determining the first ratings-independent universe estimate based on a reach of the first union and respective known audience totals of the first piece of the media and the second piece of the media.

6. The computing system of claim 1, wherein determining the second ratings-independent universe estimate comprises determining the second ratings-independent universe estimate based on the first ratings-independent universe estimate and a known audience total corresponding to at least one of the third piece of the media and the fourth piece of the media.

7. The computing system of claim 1, wherein the unknown audience portion is an unknown universe audience portion.

8. A non-transitory computer-readable medium having stored therein instructions that when executed by a computing system cause the computing system to perform a set of acts comprising:
   determining a first ratings-independent universe estimate for a first audience total corresponding to a first union of a first piece of media and a second piece of the media, a first individual audience of the first piece of media to be known and a second individual audience of the second piece of the media to be known;
   determining a second ratings-independent universe estimate for a second audience total corresponding to a second union of a third piece of the media and a fourth piece of the media, the determination of the second ratings-independent universe estimate based on an audience constant, at least one of the third piece of the media or the fourth piece of the media corresponding to an unknown audience portion included in the second audience total of the media; and
   determining an estimate of the unknown audience portion based on the second ratings-independent universe estimate for the second audience total.

9. The non-transitory computer-readable medium of claim 8, wherein the set of acts further comprises generating a report based on the estimate of the unknown audience portion.

10. The non-transitory computer-readable medium of claim 9, wherein the set of acts further comprises outputting the report.

11. The non-transitory computer-readable medium of claim 8, wherein the set of acts further comprises determining the audience constant based on the first ratings-independent universe estimate, a reach of the first union, or respective known audience totals corresponding to the first piece of the media and the second piece of the media.

12. The non-transitory computer-readable medium of claim 8, wherein determining the first ratings-independent universe estimate comprises determining the first ratings-independent universe estimate based on a reach of the first union and respective known audience totals of the first piece of the media and the second piece of the media.

13. The non-transitory computer-readable medium of claim 8, wherein determining the second ratings-independent universe estimate comprises determining the second ratings-independent universe estimate based on the first ratings-independent universe estimate and a known audience total corresponding to at least one of the third piece of the media and the fourth piece of the media.

14. The non-transitory computer-readable medium of claim 8, wherein the unknown audience portion is an unknown universe audience portion.

15. A method comprising:
   determining, by a computing system, a first ratings-independent universe estimate for a first audience total corresponding to a first union of a first piece of media and a second piece of the media, a first individual audience of the first piece of media to be known and a second individual audience of the second piece of the media to be known;
   determining, by the computing system, a second ratings-independent universe estimate for a second audience total corresponding to a second union of a third piece of the media and a fourth piece of the media, the determination of the second ratings-independent universe estimate based on an audience constant, at least one of the third piece of the media or the fourth piece of the media corresponding to an unknown audience portion included in the second audience total of the media; and
   determining, by the computing system, an estimate of the unknown audience portion based on the second ratings-independent universe estimate for the second audience total.

16. The method of claim 15, further comprising generating a report based on the estimate of the unknown audience portion.

17. The method of claim 16, further comprising outputting the report.

18. The method of claim 15, further comprising determining the audience constant based on the first ratings-independent universe estimate, a reach of the first union, or respective known audience totals corresponding to the first piece of the media and the second piece of the media.

19. The method of claim 15, wherein determining the first ratings-independent universe estimate comprises determining the first ratings-independent universe estimate based on a reach of the first union and respective known audience totals of the first piece of the media and the second piece of the media.

20. The method of claim 15, wherein determining the second ratings-independent universe estimate comprises determining the second ratings-independent universe estimate based on the first ratings-independent universe estimate and a known audience total corresponding to at least one of the third piece of the media and the fourth piece of the media.

* * * * *